(12) United States Patent
Crow et al.

(10) Patent No.: US 6,442,651 B2
(45) Date of Patent: Aug. 27, 2002

(54) SHARED CACHE PARSING AND PRE-FETCH

(75) Inventors: Doug Crow, Issaquah, WA (US); Bert Bonkowski; Harold Czegledi, both of Waterloo (CA); Tim Jenks, Seattle, WA (US)

(73) Assignee: Cacheflow, Inc., Sunnyvale, CA (US)

( * ) Notice: Subject to any disclaimer, the term of this patent is extended or adjusted under 35 U.S.C. 154(b) by 0 days.

(21) Appl. No.: 09/726,679

(22) Filed: Nov. 29, 2000

Related U.S. Application Data

(63) Continuation of application No. 08/959,313, filed on Oct. 28, 1997.

(51) Int. Cl.$^7$ .............................................. G06F 12/06
(52) U.S. Cl. ..................... 711/118; 711/130; 711/141; 709/213; 709/203
(58) Field of Search ................................. 711/130, 118, 711/141, 113; 709/213, 217, 203, 219; 707/10, 6, 103

(56) References Cited

U.S. PATENT DOCUMENTS

| | | | |
|---|---|---|---|
| 5,596,744 A | | 1/1997 | Dao et al. |
| 5,649,154 A | * | 7/1997 | Kumar et al. ................ 711/122 |
| 5,752,022 A | * | 5/1998 | Chiu et al. ................... 709/201 |
| 5,802,292 A | * | 9/1998 | Mogul ......................... 709/203 |
| 5,822,539 A | * | 10/1998 | van Hoff ..................... 709/203 |
| 5,870,769 A | * | 2/1999 | Freund ........................ 709/218 |
| 5,887,151 A | * | 3/1999 | Raz et al. .................... 712/205 |
| 5,905,999 A | * | 5/1999 | Liu et al. ..................... 711/146 |
| 5,913,033 A | * | 6/1999 | Grout .......................... 709/219 |
| 5,918,013 A | * | 6/1999 | Mighdoll et al. ............ 709/219 |
| 5,931,904 A | * | 8/1999 | Banga et al. ................ 709/217 |
| 5,933,849 A | * | 8/1999 | Srbljic et al. ................ 711/118 |
| 5,946,682 A | * | 8/1999 | Wolfe ............................. 707/5 |
| 5,961,602 A | * | 10/1999 | Thompson et al. ......... 711/124 |
| 5,974,430 A | * | 10/1999 | Mutschler, III .............. 707/10 |

(List continued on next page.)

OTHER PUBLICATIONS

Zheng Wang, and Jon Crowcroft, Department of Computer Science, Prefetching in World Wide Web, Communications: The Key to Global Prosperity. Globecom 1996 Internet 96 Conference Record, London, dated Nov. 18, 1996, pp. 28–32.*

(List continued on next page.)

Primary Examiner—Matthew Kim
Assistant Examiner—Pierre Michel Bataille
(74) Attorney, Agent, or Firm—Swernofsky Law Group PC

(57) ABSTRACT

The invention provides a method and system for reducing latency in reviewing and presenting web documents to the user. A cache coupled to one or more web clients request web documents from web servers on behalf of those web clients and communicates those web documents to the web clients for display. The cache parses the web documents as they are received from the web server, identifies references to any embedded objects, and determines if those embedded objects are already maintained in the cache. If those embedded objects are not in the cache, the cache automatically pre-fetches those embedded objects from the web server without need for a command from the web client. The cache maintains a two-level memory including primary memory and secondary mass storage. At the time the web document is received, the cache determines if any embedded objects are maintained in the cache but are not in primary memory. If those embedded objects are not in primary memory, the cache automatically pre-loads those embedded objects from secondary mass storage to primary memory without need for a request from the web client. Web documents maintained in the cache are periodically refreshed, so as to assure those web documents are not stale. The invention is applied both to original requests to communicate web documents and their embedded objects from the web server to the web client, and to refresh requests to communicate web documents and their embedded objects from the web server to the cache.

15 Claims, 2 Drawing Sheets

U.S. PATENT DOCUMENTS

| | | | |
|---|---|---|---|
| 6,026,474 A | * 2/2000 | Carter et al. | 711/147 |
| 6,085,193 A | * 7/2000 | Malkin et al. | 707/10 |
| 6,098,096 A | * 8/2000 | Tsirigotis et al. | 709/213 |
| 6,128,701 A | * 10/2000 | Malcolm et al. | 711/133 |
| 6,157,942 A | * 12/2000 | Chu et al. | 709/203 |
| 6,282,542 B1 | * 8/2001 | Carneal et al. | 709/219 |

OTHER PUBLICATIONS

Cunha, Carlos R.; Jaccoud, Carlos F.B.. Determining WWW User's Next Access and Its Application to Pre–fetching, Mar. 24, 1997. http://www.cs.bu.edu/techreports/.*

Crovella, Mark; Barford, Paul. "The Network Effects of Prefetching", http://www.cs.bu.edu/techreports/, Feb. 7, 1997.*

Z. Jiang et al, "Prefetching Links on the WWW", pp. 483–489 (Copyrgt. 1997 IEEE).*

C. Cunha et al, "Determining WWW User's Next Access and Its Application to Pre–fetching", pp. 6–11 (.COPYRGT.1997 IEEE).*

Dingle A et al: "Web cache coherence" Computer Network and ISDN system, vol. 28, Issue: 11, pp. 907–920, May 1996, Elsevier Science.*

Microsoft. TM. Proxy Server Version 2.0, High Performance Web Caching and Firewall Security in One Affordable, Integrated Product, Reviewer Guide.*

Dias G.ET ALI.: "A Smart Internet Caching System" Proceeding of the Inet'96 Conference, Montreal, Canada, Jun. 24–28, 1996.*

Wang Z et al: "Prefetching in World Wide Web". IEEE Globecom 1996, Communications: The Key to Global Prosperity. Global Internet' 96. London, UK, 18–22 No. , pp. 28–32.*

Ingrid Melve, "11 Web caching architecture, references," Mar. 6, 1997 (last modified), http://www.uninett.no/prosjekt/desire/arneberg/ref.html (2 pages).*

Peter Danzig, "NetCache Architecture and Deployment," Network Appliance, Inc., Santa Clara, California, 1998.*

Chinen K. et al: An Interactive Prefetching Proxy Server for Improvement of WWW Latency' Proceedings of the Inet'97 Conference, Kuala Lumpur, Malaysia, Jun. 24–27, 1997.*

Glassman, S. "A Caching Relay for the World Wide Web", Computer Network and ISDN Systems, vol. 27, pp. 165–173, Nov. 1994.*

Braun, H et al., "Web Traffic Characterization: an Assessment of the Impact of Caching Documents from NCSA's Web Server", Computer Network and ISDN Systems, vol. 28, pp.37–51, Dec. 1995.*

Smith, N. "The UK National Web cache—The State of the Art", Computer Network and ISDN Systems, vol. 28, pp. 11407–11414, May 1996.*

Bestavros, A., "WWW traffic Reduction and Load balancing Through Server–Based Caching", IEEE Conference on Client Server Computing, pp. 56–67, 1997.*

Blaze, M. et al., "Dynamic Hierarchical Caching in Large–Scale Distributed File Systems", IEEE Transactions on Computers, pp. 521–528, 1992.*

Syam Gadde et al, Reduce, Recycle: An Approach To Building Large Internet Caches, Operating Systems, pp. 93□98, May 1997.*

A. Ortega et al., Soft Caching: Web Cache Management Techniques For Images, Multimedia Signal Processing, pp. 475□480, Jun. 1997.*

Michael Baentsch et al., World Wide Web Caching: The Application□Level View Of The Internet, IEEE Communications Magazine, pp.: 170□178, vol. 35 6, Jun. 1997.*

Cunha et al., Determining WWW User's Next Access and its Application to Pre–Fetching, IEEE Symposium on Computers and Communications, pp. 6–11, Jun. 1997.*

* cited by examiner

SHARED CACHE PARSING AND PRE-FETCH

This application is a continuation of application Ser. No. 08/959,313 filed Oct. 28, 1997.

BACKGROUND OF THE INVENTION

1. Field of the Invention

This invention relates to caches.

2. Related Art

When presenting and reviewing data using a web browser or web client, that is, a client program for the web (the "World Wide Web") such as Netscape Corporation's "Navigator" product or Microsoft Corporation's "Internet Explorer" product, it is desirable to present the data with as little delay as possible. If the user of the web client has to wait too long for the data to be displayed, this can lead to user dissatisfaction.

Some web clients access the web using a proxy cache, that is, a device for requesting web documents on behalf of the web client and for caching those web documents for possible later use. The proxy cache acts to reduce the amount of communication bandwidth used between the web client and web servers. A proxy cache can be shared by more than one web client, in which case it acts to reduce the total amount of communication bandwidth used between all of its web clients and web servers. One advantage of the proxy cache is that web documents stored in cache can be accessed more quickly than re-requesting those web documents from their originating web server.

One problem in the art is that a document requested by the web client (a "web document") can include, in addition to text and directions for display, embedded objects which are to be displayed with the web document. Embedded objects can include pictures, such as data in GIF or JPEG format, other multimedia data, such as animation, audio (such as streaming audio), movies, video (such as streaming video), program fragments, such as Java, Javascript, or ActiveX, or other web documents, such as when using frames. The web client must parse the web document to determine the embedded objects, and then request the embedded objects from the web server.

While using a proxy cache ameliorates this problem somewhat, the problem persists. If there are many embedded objects in the web document, it can take substantial time to identify, request, communicate, and display all of them. Parsing and requesting embedded objects by the web client is serial, and most web clients are set to request only a small number of embedded objects at a time. Web clients requesting embedded objects perform this task in parallel with rendering those objects for display, further slowing operation.

Moreover, known proxy caches use a two-level memory having both primary memory and secondary mass storage. Even those embedded objects already maintained in the cache, and thus accessible by the web client without requesting them from the web server, may have been dropped out of the primary memory to secondary mass storage, possibly delaying communication of the embedded objects from the proxy cache to the web client and thus delaying display of those embedded objects to the user.

Accordingly, it would be advantageous to provide a method and system for reducing latency in reviewing and presenting web documents to the user. This advantage is achieved in a system in which web documents are parsed by a cache for references to embedded objects, and those embedded objects are pre-fetched from the web server or pre-loaded from secondary mass storage by the cache before they are requested by the web client.

Teachings of the art include (1) the known principle of computer science that devices work better when they are indifferent to the nature of the data they process, and (2) the known principle of client-server systems that it is advantageous to assign processing-intensive tasks to clients, rather than to servers, whenever possible. The invention is counter to the first teaching, as the cache alters its behavior in response to its parsing of the web documents it receives for communication to the client. The invention is also counter to the second teaching, as the cache takes on the additional processing tasks of parsing the web document for embedded objects and, if necessary, independently requesting those embedded objects from the web server.

SUMMARY OF THE INVENTION

The invention provides a method and system for reducing latency in reviewing and presenting web documents to the user. A cache coupled to one or more web clients request web documents from web servers on behalf of those web clients and communicates those web documents to the web clients for display. The cache parses the web documents as they are received from the web server, identifies references to any embedded objects, and determines if those embedded objects are already maintained in the cache. If those embedded objects are not in the cache, the cache automatically pre-fetches those embedded objects from the web server without need for a command from the web client.

In a preferred embodiment, the cache maintains a two-level memory including primary memory and secondary mass storage. At the time the web document is received, the cache determines if any embedded objects are maintained in the cache but are not in primary memory. If those embedded objects are not in primary memory, the cache automatically pre-loads those embedded objects from secondary mass storage to primary memory without need for a request from the web client.

In a preferred embodiment, web documents maintained in the cache are periodically refreshed, so as to assure those web documents are not "stale" (changed at the web server but not at the cache). The invention is applied both to original requests to communicate web documents and their embedded objects from the web server to the web client, and to refresh requests to communicate web documents and their embedded objects from the web server to the cache.

DETAILED DESCRIPTION OF THE PREFERRED EMBODIMENTS

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Inventions disclosed herein can be used in conjunction with inventions disclosed in one or more of the following patent applications:

Provisional U.S. application Ser. No. 60/048,986, filed Jun. 9, 1997, in the name of inventors Michael Malcolm and Robert Zarnke, titled "Network Object Cache Engine", assigned to CacheFlow, Inc., attorney docket number CASH-001.

U.S. application Serial No. 08/959,058, (now U.S. Pat. No. 6,128,701) filed this same day, in the name of inventors Michael Malcolm and Ian Telford, titled "Adaptive Active Cache Refresh", assigned to CacheFlow, Inc., attorney docket number CASH-003.

These applications are referred to herein as the "Cache Disclosures," and are hereby incorporated by reference as if fully set forth herein.

System Elements

Figure 1:
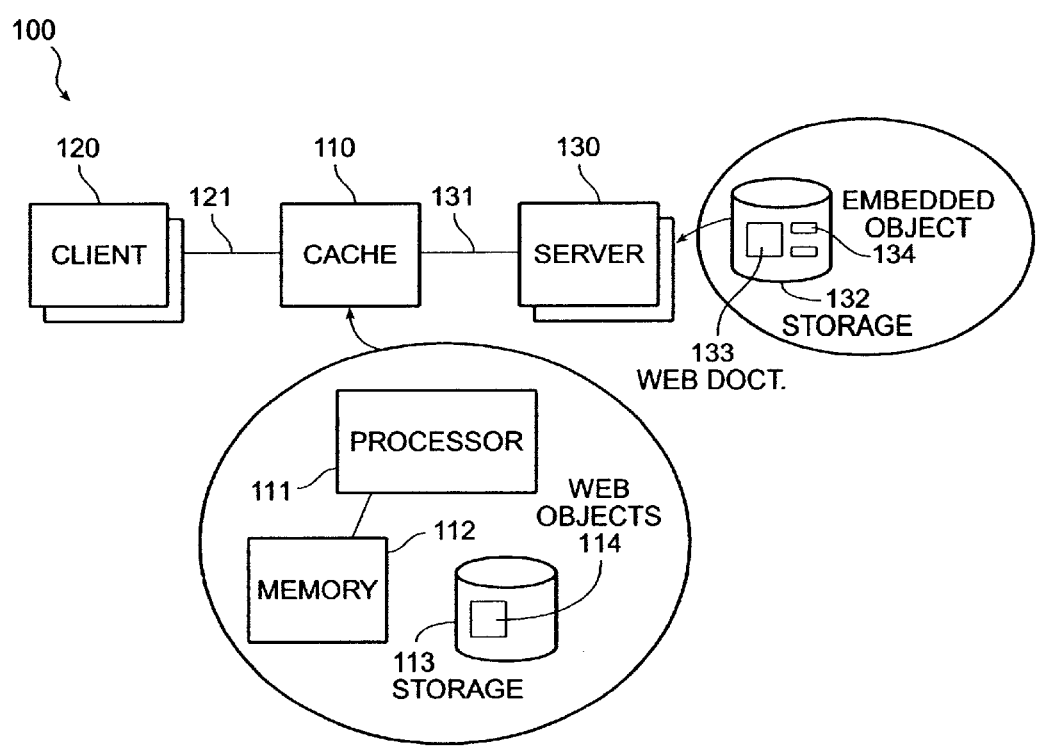
FIG. 1 shows a block diagram of a system for shared cache parsing and pre-fetch.

FIG. 1 shows a block diagram of a system for shared cache parsing and pre-fetch.

A system 100 includes a cache 110, at least one client device 120, and at least one server device 130. Each client device 120 is coupled to the cache 110 using a client communication path 121, such as a dial-up connection, a LAN (local area network), a WAN (wide area network), or some combination thereof. Similarly, each server device 130 is also coupled to the cache 110 using a server communication path 131, such as a dial-up connection, a LAN (local area network), a WAN (wide area network), or some combination thereof. In a preferred embodiment, the client communication path 121 includes a LAN, while the server communication path 131 includes a network of networks such as an internet or intranet.

As used herein, the terms "client" and "server" refer to a relationship between the client or server and the cache 110, not necessarily to particular physical devices. As used herein, one "client device" 120 or one "server device" 130 can comprise any of the following: (a) a single physical device capable of executing software which bears a client or server relationship to the cache 110; (b) a portion of a physical device, such as a software process or set of software processes capable of executing on one hardware device, which portion of the physical device bears a client or server relationship to the cache 110; or (c) a plurality of physical devices, or portions thereof, capable of cooperating to form a logical entity which bears a client or server relationship to the cache 110. The phrases "client device" 120 and "server device" 130 refer to such logical entities and not necessarily to particular individual physical devices.

The server device 130 includes memory or storage 132 having a web document 133, the web document 133 including references to at least one embedded object 134. In a preferred embodiment, the web document 133 can include text and directions for display. The embedded object 134 can include pictures, such as data in GIF or JPEG format, other multimedia data, such as animation, audio (such as streaming audio), movies, video (such as streaming video), program fragments, such as Java, Javascript, or ActiveX, or other web documents, such as when using frames.

The cache 110 includes a processor 111, program and data memory 112, and mass storage 113. The cache 110 maintains a first set of web objects 114 in the memory 112 and a second set of web objects 114 in the storage 113. (Web objects 114 can comprise web documents 133 or embedded objects 134 or both.)

In a preferred embodiment, the cache 110 includes a cache device such as described in the Cache Disclosures defined herein, hereby incorporated by reference as if fully set forth therein.

The cache 110 receives requests from the client device 120 for a web object 114 and determines if that web object 114 is present at the cache 110, either in the memory 112 or in the storage 113. If the web object 114 is present in the memory 112, he cache 110 transmits the web object 114 to the client device 120 using the client communication path 121. If the web object 114 is present in the storage 113 but not in the memory 112, the cache 110 loads the web object 114 into the memory 112 from the storage 113, and proceeds as in the case when the web object 114 was originally present n the memory 112. If the web object 114 is not present in either the memory 112 or the storage 113, the cache 110 retrieves the web object 114 from the appropriate server device 130, places the web object 114 in the memory 112 and the storage 113, and proceeds as in the case when the web object 114 was originally present in the memory 112.

Due to the principle of locality of reference, it is expected that the cache 110 will achieve a substantial "hit rate," in which many requests from the client device 120 for web objects 114 will be for those web objects 114 already maintained by the cache 110, reducing the need for requests to the server device 130 using the server communication path 131.

The cache 110 parses each web object 114 as it is received from the server device 130, separately and in parallel to any web client program operating at the client device 120. If the web object 114 is a web document 133 that includes at least one reference to embedded objects 134, the cache 110 identifies those references and those embedded objects 134, and determines if those embedded objects 134 are already maintained in the cache 110, either in the memory 112 or the storage 113.

If those embedded objects 134 are not in the cache 110 at all, the cache 110 automatically, without need for a command from the web client, requests those embedded objects 134 from the server device 130.

The cache 110 has a relatively numerous set of connections to the server communication path 131, and so is able to request a relatively numerous set of embedded objects 134 in parallel from the server device 130. Moreover, the cache 110 parses the web document 133 and requests embedded objects 134 in parallel with the web client at the client device 120 also parsing the web document 133 and requesting embedded objects 134. The embedded objects 134 are available to the cache 110, and thus to the client device 120, much more quickly.

If those embedded objects 134 are maintained in the cache 110, but they are in the storage 113 and not in the memory 112, the cache 110 automatically, without need for a command from the web client, loads those embedded objects 134 from the storage 113 into the memory 112.

In a preferred embodiment, those web objects 114 maintained in the cache 110 are periodically refreshed, so as to assure those web objects 114 are not "stale" (changed at the server device 130 but not at the cache 110). To refresh web objects 114, the cache 110 selects one web object 114 for refresh and transmits a request to the server device 130 for that web object 114. The server device 130 can respond with a copy of the web object 114, or can respond with a message that the web object 114 has not changed since the most recent copy of the web object 114 was placed in the cache 110. If the web object 114 has in fact changed, the cache 110 proceeds as in the case when a client device 120 requested a new web object 114 not maintained in the cache 110 at all. If the web object 114 has in fact not changed, the cache 110 updates its information on the relative freshness of the web object 114, as further described in the Cache Disclosures.

Method of Operation

Figure 2:
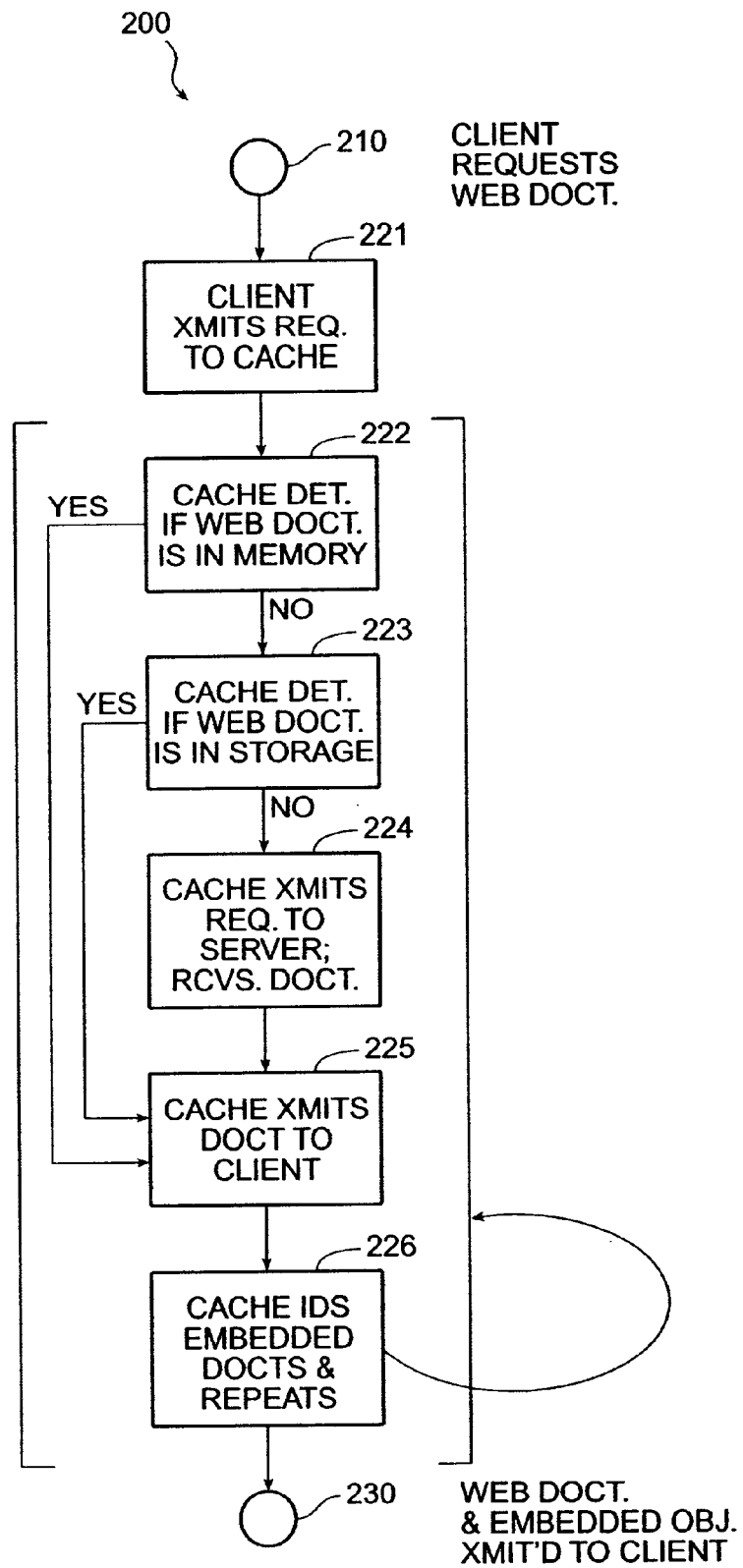
FIG. 2 shows a flow diagram of a method for shared cache parsing and pre-fetch.

FIG. 2 shows a flow diagram of a method for shared cache parsing and pre-fetch.

A method 200 includes a set of flow points to be noted, and steps to be executed, cooperatively by the system 100, including the cache 110, the client device 120, and the server device 130.

At a flow point 210, the client device 120 is ready to request a web document 133 from the server device 130. For example, the web document 133 can comprise an HTML page having a set of embedded objects 134.

At a step 221, the client device 120 transmits a request for the web document 133, using the client communication path 121, to the cache 110.

At a step 222, the cache 110 determines if that web document 133 is located in the memory 112 at the cache 110. If so, the cache 110 proceeds with the step 225. Otherwise, the cache 110 proceeds with the step 223.

At a step 223, the cache 110 determines if that web document 133 is located in the storage 113 at the cache 110 (but not in the memory 112). If so, the cache 110 loads the web document 133 from the storage 113 into the memory 112, and proceeds with the step 225. Otherwise, the cache 110 proceeds with the step 224.

At a step 224, the cache 110 transmits a request to the server device 130 for the web document 133. The server device 130 receives the request and transmits the web document 133 to the cache 110. The cache 10 stores the web document 133 in the memory 112 and the storage 113 and proceeds with the step 225.

At a step 225, the cache 110 transmits the web document 133 to the client device 120 for display. In parallel, the cache 110 parses the web document 133 and determines if there are any references to embedded objects 134. If not, the cache 110 proceeds with the flow point 230. Otherwise, the cache 110 proceeds with the step 226.

At a step 226, the cache 110 identifies the embedded documents 134 and repeats the steps 222 through 226 inclusive (including repeating this step 226) for each such embedded document 134. Web documents 133 in "frame" format can refer to embedded documents 134 that are themselves web documents 133 and themselves refer to embedded documents 134, and so on. There is no prospect of an infinite loop if web document 133 is self-referential because the cache 110 will simply discover at the second reference that the web document 133 is already maintained in the cache 110.

At a flow point 230, the web document 133 and all its embedded objects 134 have been transmitted to the client device 120 for display.

When the cache 110 refreshes a web object 114, the cache 110 performs the steps 222 through 226 inclusive (including repeating the step 226) for the web object 114 and for each identified embedded object 134 associated with the web object 114.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method, including the steps of:
  receiving a web document at a shared cache from a web server or mass storage for communicating said web document to a web client for display;
  parsing, by said shared cache, said web documents for reference to embedded objects;
  determining if said embedded objects are already maintained in said shared cache; and
  periodically refreshing said embedded objects by selecting at least one cached object actually present in said shared cache, and for the selected object, requesting from said web server a new copy of the selected object without need for a command from said web client.

2. A computer controlled method for reducing access delays associated with accesses to a proxy cache, said proxy cache having a mass storage, a memory and at least one central processor unit (CPU), said mass storage and said memory for storing a plurality of cached objects received from a network from at least one server, said method including steps of:
  providing, by said proxy cache, a specified web document from said at least one server responsive to a request from a client;
  parsing, by said proxy cache, said specified web document to identify a set of embedded references;
  determining, by said proxy cache, which of said set of embedded references reference a set of not-cached-objects not in said plurality of cached objects;
  requesting, by said proxy cache and independent of an additional request from said client, one or more of said set of not-cached-objects responsive to the step of determining;
  receiving, by said proxy cache, said one or more of said set of not-cached-objects;
  adding, by said proxy cache, said one or more of said set of not-cached-objects to said plurality of cached objects; and
  periodically refreshing said embedded objects by selecting at least one cached object actually present in said proxy cache, and for the selected object, requesting from said server a new copy of the selected object without need for a command from said client.

3. The computer controlled method of claim 2, wherein the step of providing includes steps of:
  receiving, by said proxy cache, said request from said client for said specified web document from said at least one server;
  requesting, by said proxy cache, said specified web document from said at least one server;
  receiving, by said proxy cache, said specified web document;
  adding, by said proxy cache, said specified web document to said plurality of cached objects; and
  sending, by said proxy cache, said specified web document to said client to satisfy said request.

4. The computer controlled method of claim 2, wherein the step of requesting one or more of said set of not-cached-objects includes requesting a plurality of said set of not-cached-objects in parallel.

5. The computer controlled method of claim 2, further including steps of:
  receiving, by said proxy cache, a new request identifying one of said set of embedded references; and
  sending, by said proxy cache, a requested object from said plurality of cached objects, said requested object responsive to said new request.

6. The computer controlled method of claim 2, whereby said set of embedded references is selected from the group consisting of a reference to numerical data, a reference to textual data, a reference to multimedia data, a reference to audio data, a reference to video data, a reference to program data, or a reference to a web document.

7. A system, including
a shared cache coupled to at least one web server and coupled to a plurality of web clients, said shared cache being capable of receiving requests for web documents from said web clients, requesting said web documents from said web server or mass storage, receiving said web documents from said web server or mass storage, and communicating said web documents to said web clients;
said shared cache including:
means for parsing said web documents for references to embedded objects;
means for determining if said objects are already maintained in said shared cache; and
means for periodically refreshing said embedded objects by selecting at least one cached object actually present in said shared cache, and for requesting, for the selected object and from said web server, a new copy of the selected object without need for a command from said web clients.

8. A proxy cache having a central processing unit (CPU) and a memory coupled to said CPU for reducing access delays associated with accesses to said proxy cache, said proxy cache having a mass storage, said mass storage and said memory for storing a plurality of cached objects received from a network from at least one server, said proxy cache includes:
a cache mechanism configured to provide a specified web document from said at least one server responsive to a request from a client;
a parse mechanism configured to parse said specified web document to identify a set of embedded references;
a selection mechanism configured to select which of said set of embedded references reference a set of not-cached-objects not in said plurality of cached objects, said set of embedded references determined by the parse mechanism;
a pre-fetch mechanism configured to request, independently of an additional request from said client, one or more of said set of not-cached-objects responsive to the selection mechanism;
a reception mechanism configured to receive said one or more of said set of not-cached-objects requested by the pre-fetch mechanism;
a cache insertion mechanism configured to add said one or more of said set of not-cached-objects to said plurality of cached objects after receipt by the reception mechanism; and
a cache refresh mechanism configured to periodically refresh said plurality of cached objects by selecting at least one cached object actually present in said proxy cache, and for the selected object, requesting from said server a new copy of the selected object without need for a command from said client.

9. The proxy cache of claim 8, wherein the pre-fetch mechanism includes a parallel request mechanism configured to request a plurality of said set of not-cached-objects in parallel.

10. The proxy cache of claim 8, whereby said set of embedded references is selected from the group consisting of a reference to numerical data, a reference to textual data, a reference to multimedia data, a reference to audio data, a reference to video data, a reference to program data, or a reference to a web document.

11. A shared cache, including
means for parsing web documents, said web documents being received from a web server or mass storage, for references to embedded objects;
means for determining if said objects are already maintained in said shared cache; and
means for periodically refreshing said embedded objects by selecting at least one cached object actually present in said shared cache, and for requesting, for the selected object and from said web server, a new copy of the selected object without need for a command from said web client.

12. A computer program product including:
a computer usable storage medium having computer readable code embodied therein for causing a computer, having a memory and a mass storage, to reduce access delays associated with accesses to a proxy cache, said mass storage and said memory for storing a plurality of cached objects received from a network from at least one server, said computer readable code including:
computer readable program code configured to cause said computer to effect a cache mechanism configured to provide a specified web document from said at least one server responsive to a request from a client;
computer readable program code configured to cause said computer to effect a parse mechanism configured to parse said specified web document to identify a set of embedded references;
computer readable program code configured to cause said computer to effect a selection mechanism configured to select which of said set of embedded references reference a set of not-cached-objects not in said plurality of cached objects, said set of embedded references determined by the parse mechanism;
computer readable program code configured to cause said computer to effect a pre-fetch mechanism configured to request, independently of an additional request from said client, one or more of said set of not-cached-objects responsive to the selection mechanism;
computer readable program code configured to cause said computer to effect a reception mechanism configured to receive said one or more of said set of not-cached-objects requested by the pre-fetch mechanism;
computer readable program code configured to cause said computer to effect a cache insertion mechanism configured to add said one or more of said set of not-cached-objects to said plurality of cached objects after receipt by the reception mechanism; and
computer readable program code configured to cause said computer to effect a cache refresh mechanism configured to periodically refresh said plurality of cached objects by selecting at least one cached object actually present in said proxy cache, and for the selected object, requesting from said server a new copy of the selected object without need for a command from said client.

13. The computer program product of claim 12, wherein the pre-fetch mechanism includes computer readable program code configured to cause said computer to effect a parallel request mechanism configured to request a plurality of said set of not-cached-objects in parallel.

14. The computer program product of claim 12, whereby said set of embedded references is selected from the group consisting of a reference to numerical data, a reference to textual data, a reference to multimedia data, a reference to audio data, a reference to video data, a reference to program data, or a reference to a web document.

15. A computer program product including:

a computer data signal embodied in a carrier wave having computer readable code embodied therein for causing a computer, having a memory and a mass storage, to reduce access delays associated with accesses to a proxy cache, said mass storage and said memory for storing a plurality of cached objects received from a network from at least one server, said computer readable code including:

computer readable program code configured to cause said computer to effect a cache mechanism configured to provide a specified web document from said at least one server responsive to a request from a client;

computer readable program code configured to cause said computer to effect a parse mechanism configured to parse said specified web document to identify a set of embedded references;

computer readable program code configured to cause said computer to effect a selection mechanism configured to select which of said set of embedded references reference a set of not-cached-objects not in said plurality of cached objects, said set of embedded references determined by the parse mechanism;

computer readable program code configured to cause said computer to effect a pre-fetch mechanism configured to request, independently of an additional request from said client, one or more of said set of not-cached-objects responsive to the selection mechanism;

computer readable program code configured to cause said computer to effect a reception mechanism configured to receive said one or more of said set of not-cached-objects requested by the pre-fetch mechanism;

computer readable program code configured to cause said computer to effect a cache insertion mechanism configured to add said one or more of said set of not-cached-objects to said plurality of cached objects after receipt by the reception mechanism; and computer readable program code configured to cause said computer to effect a cache refresh mechanism configured to periodically refresh said plurality of cached objects by selecting at least one cached object actually present in said proxy cache, and for the selected object, requesting from said server a new copy of the selected object without need for a command from said client.

* * * * *